(12) United States Patent
Whitney

(10) Patent No.: US 6,648,515 B2
(45) Date of Patent: Nov. 18, 2003

(54) EDGE WELDED SLIDING BEARING

(75) Inventor: Warren J. Whitney, Ypsilanti, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 59 days.

(21) Appl. No.: 10/085,909

(22) Filed: Feb. 28, 2002

(65) Prior Publication Data

US 2003/0161560 A1 Aug. 28, 2003

(51) Int. Cl.$^7$ .............................. F16C 9/00; F16C 35/02; F16C 43/02
(52) U.S. Cl. ..................... 384/294; 384/295; 384/430
(58) Field of Search ............................ 384/276, 294, 384/295, 288, 429, 430; 29/888.091, 898.042, 898.07; 74/579 R, 580, 589, 593, 594

(56) References Cited

U.S. PATENT DOCUMENTS

| | | | |
|---|---|---|---|
| 1,492,119 A | | 4/1924 | Burger et al. |
| 1,634,784 A | * | 7/1927 | Kindervater ................ 403/148 |
| 1,768,529 A | | 6/1930 | Short |
| 1,831,325 A | | 11/1931 | Short |
| 1,834,746 A | | 12/1931 | Short |
| 1,863,809 A | | 6/1932 | Hopkins et al. |
| 1,948,176 A | | 2/1934 | Hopkins et al. |
| 1,957,111 A | | 5/1934 | Short |
| 1,970,024 A | | 8/1934 | Stockfleth |
| 2,398,786 A | * | 4/1946 | Hanks ........................ 384/296 |
| 2,533,822 A | | 12/1950 | Lee et al. |
| 3,469,063 A | | 9/1969 | Van Dorn |
| 3,786,555 A | | 1/1974 | Robertson et al. |
| 3,961,149 A | | 6/1976 | Robertson et al. |
| 4,494,286 A | | 1/1985 | Kaufman |
| 4,983,797 A | | 1/1991 | McAllister et al. |
| 5,026,967 A | | 6/1991 | Bell et al. |
| 5,056,937 A | * | 10/1991 | Tanaka et al. .............. 384/278 |
| 5,187,345 A | | 2/1993 | Alling et al. |
| 5,324,913 A | | 6/1994 | Oberg et al. |
| 5,731,566 A | | 3/1998 | Steinhart |

FOREIGN PATENT DOCUMENTS

EP 1 279 843 * 1/2003

* cited by examiner

Primary Examiner—William C Joyce
(74) Attorney, Agent, or Firm—Howard & Howard

(57) ABSTRACT

Sliding-type bearings are locally welded along only edge regions of the backing to the components in which they are installed. Welding is controlled to isolate the bearing layer from the heat effected zone of welding.

20 Claims, 3 Drawing Sheets

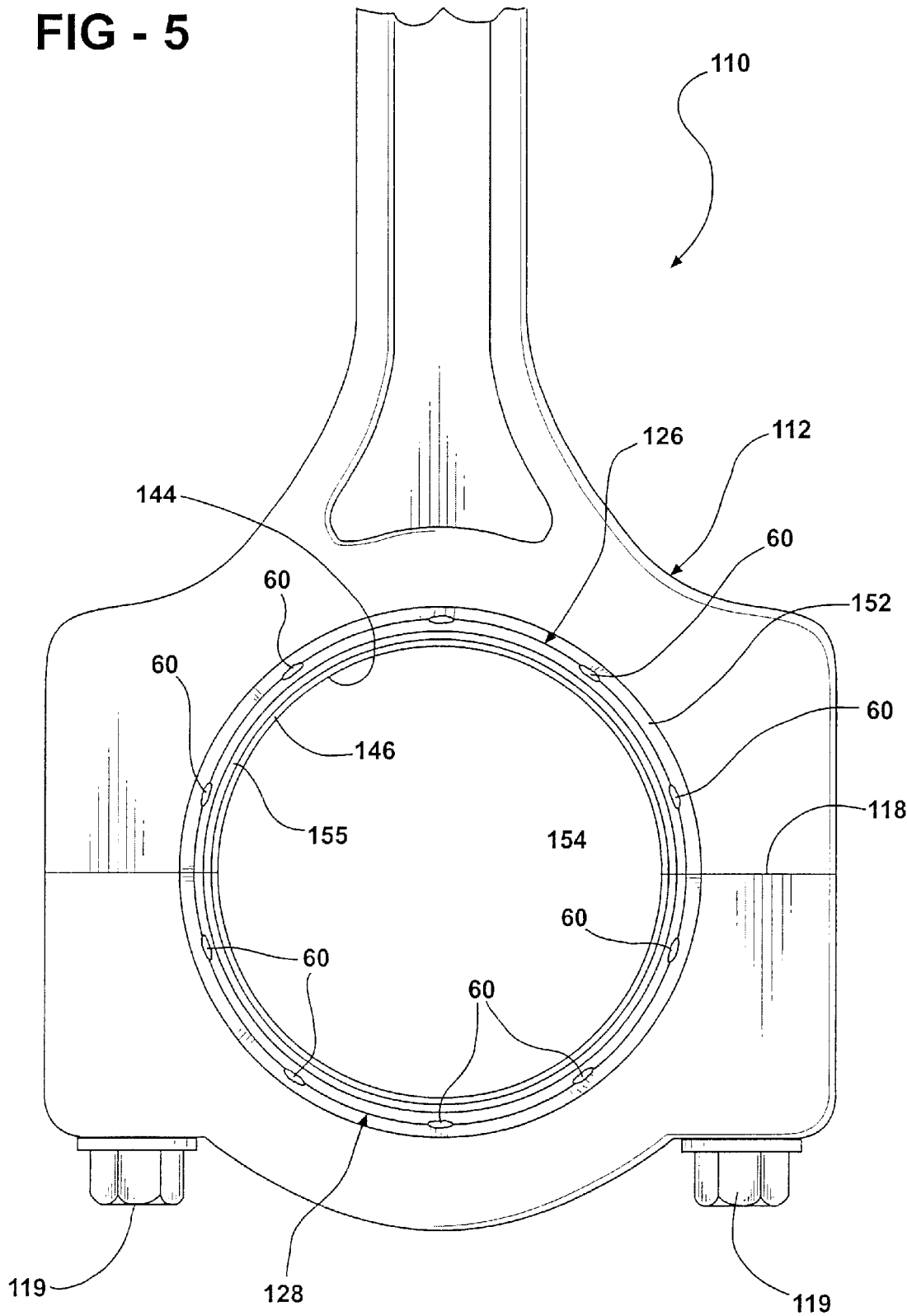

EDGE WELDED SLIDING BEARING

BACKGROUND OF THE INVENTION

1. Technical Field

This invention relates generally to metallic sliding bearings of the type in which a layer of bearing material is applied to a steel backing and supported by a component for journaling another relatively rotatable component, and more particularly to the manner of securing such bearings in use.

2. Related Art

Sliding bearings are used in many applications for journaling a relatively rotatable member. In the case of a connecting rod for internal combustion engines, the large end of the rod has a cylindrical bore and is split to provide a separable bearing cap for securing the large end about a relatively rotatable crankshaft of the engine. Typically, a set of half sliding bearings are installed in the bore with the convex outer surface of the steel backing of the half bearings seated against the concave wall of the bore and separated across the parting plane of the bearing cap. In a typical connecting rod, the bearing cap portion is bolted under high load to the companion upper half of the large end with sufficient force to clamp the half sliding bearings against movement relative to the connecting rod. To sustain such clamping force, high temper bolts must be used and sufficient material in the shoulder regions of the large end provided for supporting such clamping loads without failure of the connecting rod material. The need for high temper bolts and material mass adds to the cost, weight and size of connecting rods.

It has been proposed to permanently join half shells of porous sliding bearings to the bore surface of the large end of connecting rods by way of resistance welding or high temperature bonding to yield a substantially co-extensive metal bond across the full contact surfaces of the united parts. In U.S. Pat. No. 1,768,529, for example, the bearing shell and connecting rod are heated to an elevated temperature and the joining surfaces coated with tin which, upon cooling, unites the bearing to the connecting rod. In U.S. Pat. No. 1,957,111, the half bearing and connecting rod are heated to an elevated temperature sufficient to weld the bearing shell to the connecting rod across their contiguous contact surfaces without the use of a low temperature bonding metal, such as tin. In both cases, the bearing metal is subjected directly or indirectly to the heat of welding.

SUMMARY OF THE INVENTION

A combination of a component and a sliding bearing for supporting a member for rotation relative to the component according to a presently preferred embodiment of the invention comprises a metal backing of the sliding bearing having a convex outer surface extending longitudinally between opposite ends and laterally between opposite edge regions of the backing. At least one layer of a relatively softer bearing material is applied to a concave inner surface of the bearing. A concave seat of the component supports the convex outer surface of the metal backing. According to the invention, the backing is edge welded only along the edge regions to the component for securing the bearing to the component. The invention also contemplates a method of joining a sliding bearing to a component which involves edge welding the lateral edge portions only of the backing to the component defining edge welds which are spaced across a central region of the backing between the edge weld.

The invention has the advantage of enabling a modem sliding bearing to be secured permanently to a component by welding in a manner that does not subject the bearing material of the sliding bearing to the heat of welding. By securing the backing with only edge welds, a central region of the backing between the edge weld is not subjected to the heat of welding and thus the bearing material is isolated from such heat.

Isolating the bearing material from the heat of welding has the advantage of preserving the physical properties of the bearing metal. Known prior welding techniques which subject the entire sliding bearing, including the bearing material, to the heat of welding or joining, could alter or destroy any bearing layer materials which are commonly used in sliding bearing applications. Such bearing materials including, but are not limited to, aluminum alloys, cooper alloys, tin, lead, plastics and the like.

The invention has the farther advantage of enabling conventional backing and bearing layer materials to be used in the edge-welded bearing. Since the bearing material is protected against the heat of welding by provision of the edge welds, such conventional bearing metals as aluminum alloys, copper alloys, tin, lead, plastics, and the like can be employed and welded without concern for damage or loss of properties.

The invention has the further advantage of minimizing the clamping requirement in connecting rod and other applications where a bolted bearing cap is used. Since the sliding bearing is held in place by the edge welds and does not rely solely on the clamping force from the bearing cap bolts to hold the bearings in place in use, lighter, less costly bolts can be employed and less material can be provided to the shoulder regions of the components where the bolts are held.

The invention has the further advantage of simplifying the manufacture of component parts that have such sliding bearings by eliminating the need to final finish the surface of the concave bearing seat of the component prior to receiving the sliding bearing. The edge welds eliminate the need for such final finishing while providing the needed support to the sliding bearing in use.

THE DRAWINGS

These and other features and advantages of the present invention will become more readily appreciated when considered in connection with the following detailed description and appended drawings, wherein:

FIG. 5 is a fragmentary end view of an alternative embodiment of a component with an edge welded sliding bearing.

DETAILED DESCRIPTION

Figure 1:
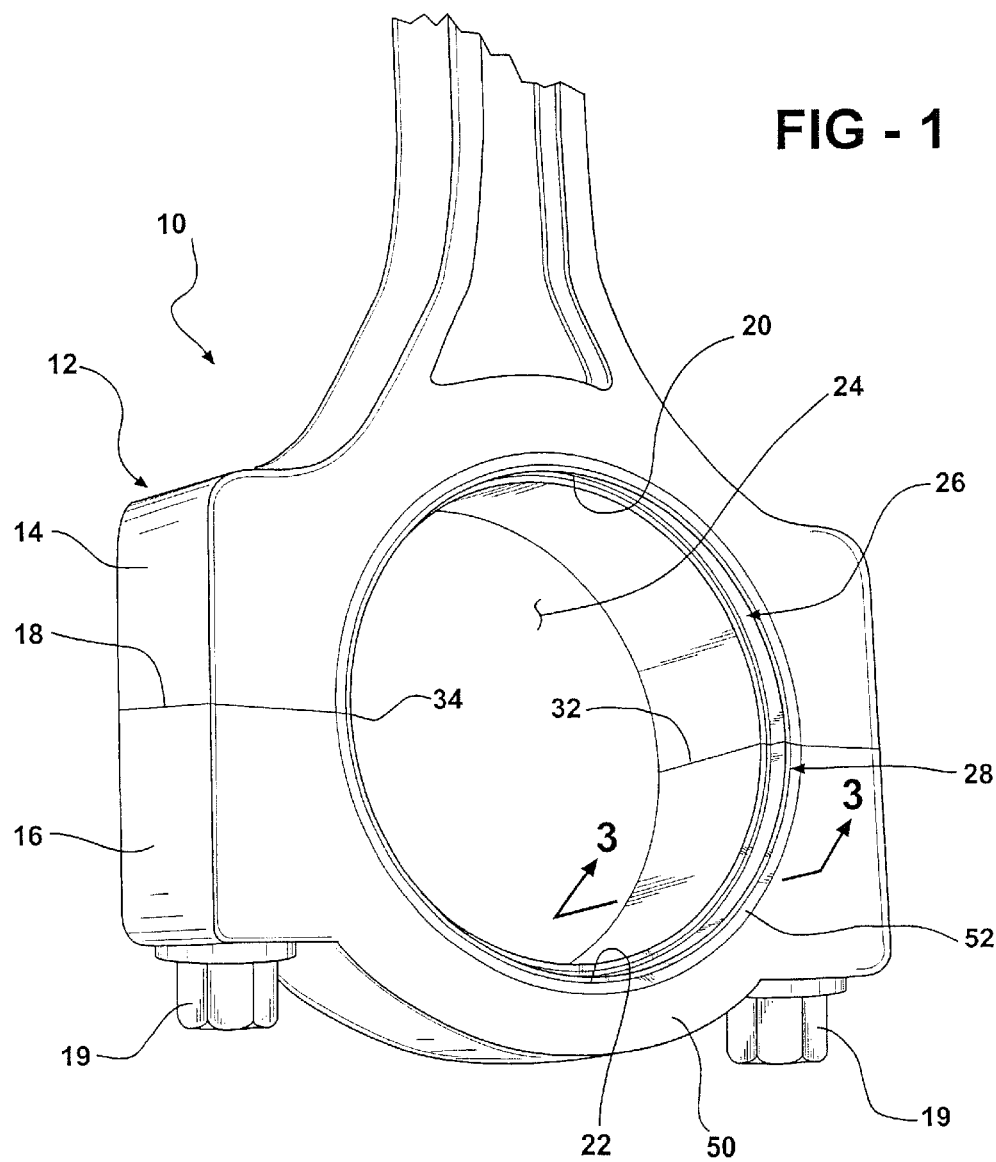
FIG. 1 is an enlarged fragmentary perspective view of the large end of a connecting rod component shown fitted with bearing inserts, but prior to welding.

FIG. 1 illustrates a metal connecting rod component 10 whose large end 12 is formed of an upper part 14 and a lower part or bearing cap 16 which is separable from the upper part 14 across a parting plane 18 and joined by bolts 19. The upper and lower parts 14, 16 have opposing concave bearing seats 20, 22, respectively, which together define a large end bore 24 that is substantially circular for accommodating a crankshaft (not shown) rotatable within the bore 24 in known manner for displacing the connecting rod 10.

Figure 3:
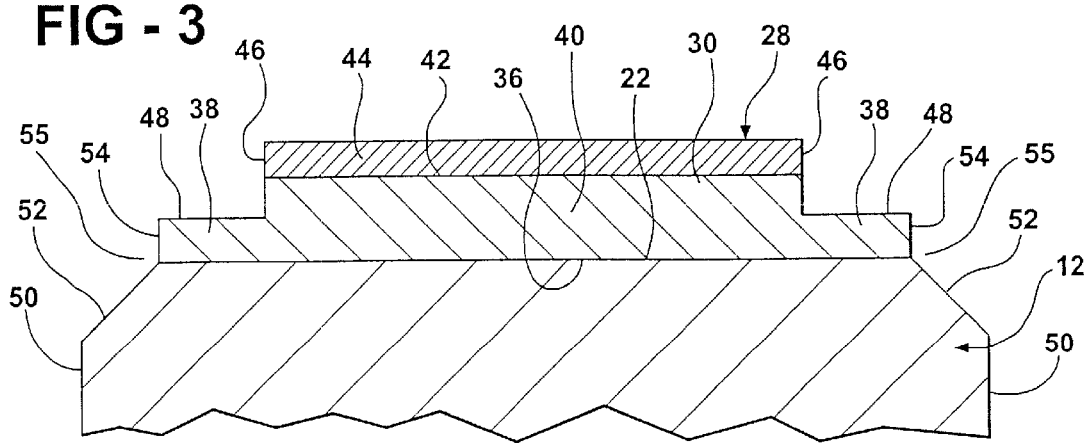
FIG. 3 is an enlarged cross-sectional view taken generally along lines 3—3 of FIG. 1.

As also illustrated in FIG. 1, the bore 24 is fitted with a set of opposing upper and lower sliding bearing inserts 26, 28 which are seated against the associated upper and lower bearing seats 20, 22 of the upper and lower parts 14, 16 of the connecting rod 10. Referring additionally to FIG. 3, which illustrates a lateral section view through one of the bearing inserts which, for purposes of illustration is shown to be the lower bearing insert 28 (the upper bearing insert being identical and thus the description with regard to the lower bearing insert applying equally to the upper bearing insert), it will be seen that the bearing insert 28 includes a metal backing 30, preferably fabricated of steel, having a generally semi-circular profile along its length between opposite ends 32, 34 which preferably lie in the parting plane 18 when the upper and lower parts 14, 16 of the connecting rod 10 are joined. The arcuate metal backing 30 presents a convex outer surface 36 that extends longitudinally between the opposite ends 32, 34 along the length of the metal backing 30, and laterally between opposite edge regions 38. Between the edge regions 38, the backing 30 has a central region which separates and forms a boundary between the edge regions 38.

The metal backing 30 further includes a concave inner surface 42 onto which a layer of a relatively softer bearing material 44 is applied to provide a running surface for the crankshaft (not shown). As illustrated best in FIG. 3, the bearing layer 44 is preferably applied to only the central region 40 of the metal backing 30, with laterally opposite edges 46 of the bearing layer 44 being spaced laterally inwardly from the edge regions 38 of the metal backing 30. In other words, the edges 46 of the bearing layer 44 are preferably inset a distance from the opposite edges of the metal backing 30, establishing what can be considered the central region 40 of the metal backing 30, beyond which are the edge regions 38. As also shown in FIG. 3, the central region 40 of the backing 30 has a thickness between the outer and inner surfaces 36, 42 which is relatively thicker than that of the edge regions 38. The edge regions 38 are preferably free of bearing layer material 44. The edge regions 38 thus form relatively thin side flanges of the metal backing 30 which extend laterally to either side of the central region 40 outwardly of the edges 46 of the bearing layer 44. The edge regions 38 have an upper surface 48 which is spaced below the inner surface 42 of the central region 40 on which the bearing layer 44 is applied.

As also best shown in FIG. 3, the edge regions 38 of the metal backing 30 overlie and are supported on the bearing seats 18, 20 of the upper and lower connecting rod parts 14, 16, with the edge regions 38 being disposed adjacent laterally opposite edge regions 50 of the bearing seats 20, 22. Preferably, the edge regions 50 of the connecting rod parts 14, 16 have a chamfered end face 52 which terminates laterally inwardly adjacent outermost end faces 54 of the edge regions 38 of the backing 30, forming, prior to welding, an obtuse angled pocket 65 between the end faces 52, 54 when viewed in transverse section as in FIG. 3.

The exposed edge regions 38 of the metal backing 30 may be formed by fabricating the metal backing 30 and bearing layer 44 in strip form and then machining away bearing layer and metal backing material along the opposite edges to establish the stepped, relatively thin edge region flanges 38 of the metal backing 30 extending outwardly of and spaced from the bearing layer material 44. The strip may then be cut to length and formed to the arcuate shape typical of such sliding-type bearing shells used for journaling a shaft and the like. The bearing layer material 44 may comprise any of a number of bearing layer materials now in existence or which may be developed suitable for providing a running surface or foundation to an element such as a shaft moving across the bearing material. For example, materials such as copper, lead, tin, aluminum and other metallics and alloys thereof would be suitable candidates for the bearing material 44, as would plastics, composites, and the like. The manner by which the bearing material 44 is applied to the backing 30 is not critical to the invention. As such, an otherwise conventional sliding bearing modified to include the edge regions could be used with the present invention and be edge welded to another component.

Figure 2:
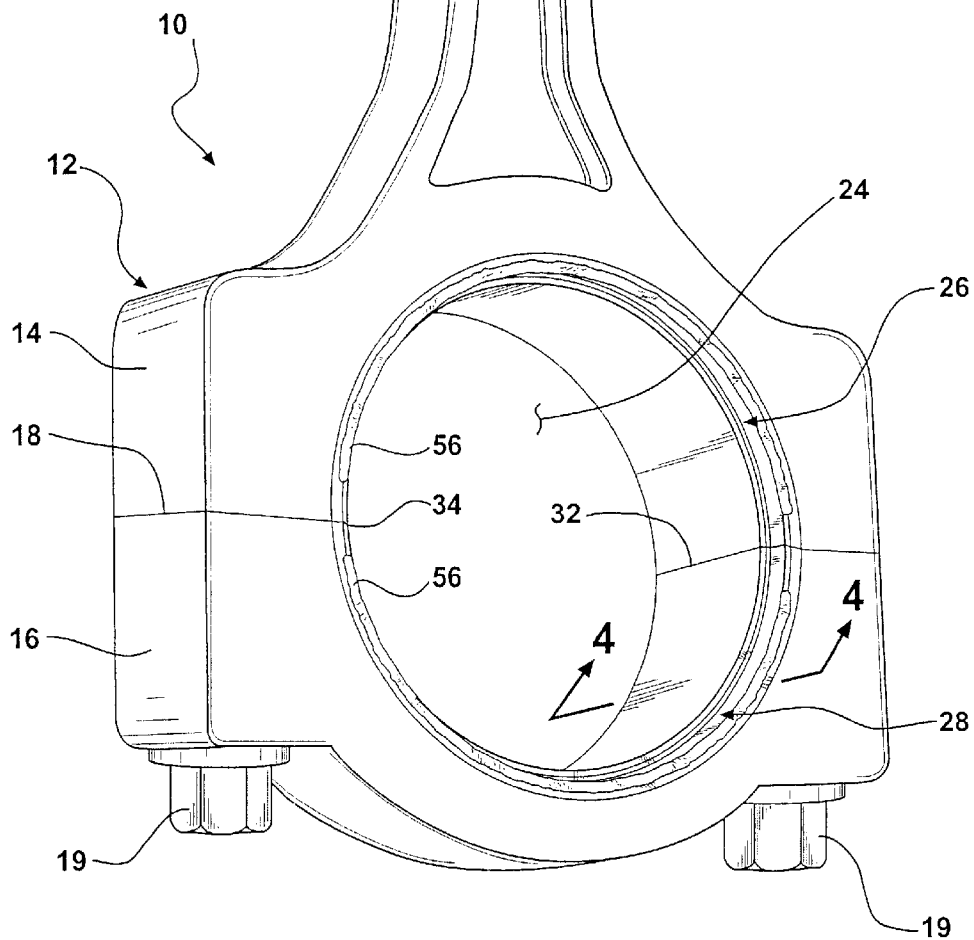
FIG. 2 is a view like FIG. 1, but showing the bearing inserts edge welded to the component.
Figure 4:
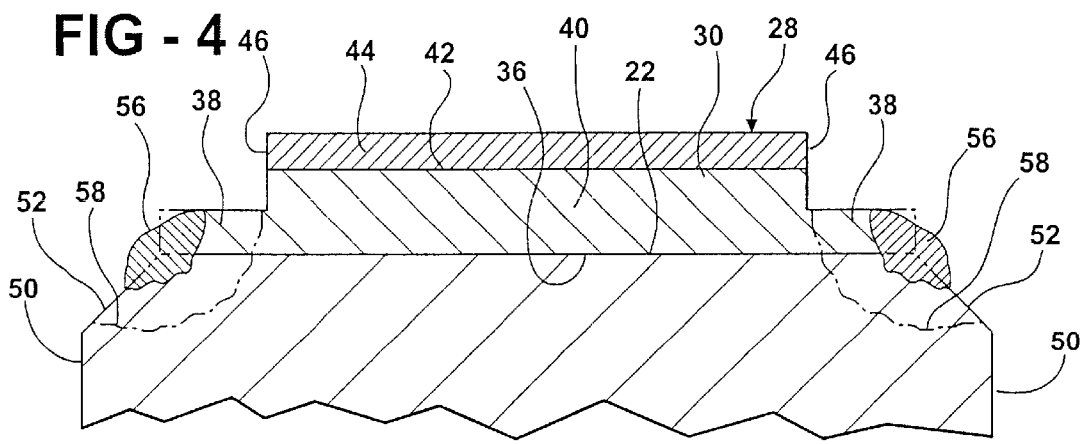
FIG. 4 is an enlarged sectional view taken generally along lines 4—4 of FIG. 2.

As illustrated best in FIGS. 2 and 4, once the bearing inserts 26, 28 are formed in the manner described and seated in the bore 24 against the concave bearing seats 20, 22 of the upper and lower connecting rod parts 14, 16, the bearing inserts 26, 28 are welded to their respective upper and lower connecting rod parts 14, 16 to secure them permanently to the connecting rod parts 14, 16. As shown in these drawings, only the exposed edge regions 38 of the metal backing 30 are locally welded to the upper and lower connecting rod parts 14, 16, such that there is a permanent metallurgical union between the edge regions 38 of the metal backing and the adjacent edge regions 50 of the connecting rod parts 14, 16, with the central region 40 of the metal backing 30 being locally separate from and detached (i.e., non-welded or bonded) to the material of the upper and lower connecting rod parts 14, 16, while nonetheless being firmly in contact with and supported by the concave bearing seats 20, 22 of the connecting rod parts 14, 16. Thus, as thus illustrated in FIG. 3, the edge regions 38 are joined by localized weldments 56 to the corresponding edge regions 50 of the associated connecting rod parts 14, 16, with the weldments extending preferably but not necessarily continuously in the circumferential direction toward the opposite ends 32, 34 of the metal backing, and preferably terminating short of the ends 32, 34 such that the weldments 56 to not extend across the parting plane 18 so as to maintain the upper and lower parts 14, 16 separable from one another across the parting plane 18 after the bearing inserts 26, 28 have been welded to the upper and lower parts 14, 16. As best shown in FIG. 4, the weldments 56 are spaced from one another in the lateral direction of the metal backing 30, such that the weld is discontinuous across the central region 40 so that only the edge regions 38 are locally secured.

As also shown in FIG. 4, the weldments 56 are spaced from the bearing layer 44. Further, the outer boundary of a heat-effected zone 58 which results from edge welding is spaced from the bearing layer 44, such that the bearing layer is not negatively affected by the heat generated by the edge welding process. In this way, it is assured that the bearing layer 44 sustains substantially the same desirable properties before and after welding of the metal backing 30, such that the bearing layer 44 is isolated from the effects of the heat affected zone 58.

The preferred method of edge welding the backing 30 to the component 14, 16 is preferably one which generates only a small heat effective zone 58 such that it does not extend into the bearing layer 44. One preferred welding technique is laser welding which applies highly localized energy beams which melt and join the material of the metal backing 30 with that of the material of the component 14, 16 and generating a heat effective zone 58 which is isolated from the bearing layer 44. TIG welding may also be employed as may be other techniques which satisfy the above criteria of locally edge welding the backing to the component while isolating the bearing layer from the heat effected zone of welding.

While the bearings 26, 28 have been described with respect to being edge welded to a connecting rod, it will be appreciated that the same technique may be used to edge weld sliding-type bearings to any of a number of components, such as engine blocks, housings, etc. to permanently affix the bearing to the component for journaling a shaft or supporting a sliding member or the like.

One advantage associated with the present invention is that the concave bearing seat 20, 22 need not be final machined in the manner that is normally required when replaceable bearing inserts are installed in such seats. The edge weld technique enables the bearing seats 20, 22 to be provided in a rough formed state. The stability and support to the bearings 26, 28 comes in large part from the edge welds and not solely from the bearing seat.

FIG. 5 shows an alternative embodiment of the invention wherein the same reference numerals are used to indicate like features, but are offset by 100. Shown is a component 110, such as connecting rod of the type previously described, having the same sliding bearing inserts 126, 128 as illustrated in FIGS. 1 and 3. The bearing inserts 126, 128 are edge welded to the connecting rod component 110 in the same general manner as previously described, except that the welds are not continuous in the circumferential direction, but rather interruptal along their lengths so as to provide a series of spaced weld segments or spot welds 60 along the edges. The individual weld segments 60 have the same character as the weldments 56 of the first embodiment of FIGS. 2 and 4, wherein only the edges of the backing are joined to the component and the heat affected zone from the welds do not extend into the bearing layer, thereby protecting the bearing layer from the heat of welding while fixing the backing permanently to the component.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A combination of a component and a sliding bearing for supporting a member for movement relative to said component, said combination comprising:

a metal backing of the bearing having a convex outer surface and a concave inner surface extending longitudinally between opposite ends and laterally between opposite edge regions of said backing;

at least one layer of a relatively softer bearing material applied to said concave inner surface of said backing;

a concave seat of said component supporting said convex outer surface of said metal backing;

said backing being edge welded only along said edge regions to said component for securing said bearing to said component, and said edge regions of said backing extending laterally beyond said bearing material.

2. The combination of claim 1 wherein said component comprises a connecting rod having upper and lower parts joined separably across a parting plane, one of said sliding bearings being disposed in each of said upper and lower parts in opposing relation to one another, said edge welding of said bearings being interrupted across said parting plane.

3. The combination of claim 1 wherein said edge welding of said backing produces weldments at said edge regions which are spaced laterally from one another across said convex backing of said bearing.

4. The combination of claim 3 wherein said weldments are continuous in the longitudinal direction along said edge portions.

5. The combination of claim 3 wherein said bearing metal has lateral edge margins disposed laterally inwardly of said weld joints.

6. The combination of claim 3 wherein said weld joints produce a heat affected zone spaced from said bearing metal.

7. The combination of claim 1 wherein said concave inner surface of said bearing in said lateral edge regions is free of said bearing metal.

8. The combination of claim 1 wherein said edge regions of said backing are relatively thinner than a central region of said backing laterally between said edge regions.

9. The combination of claim 1 wherein said inner surface of said backing is formed with laterally spaced steps defining said lateral edge portions which are relatively thinner than a remainder of said backing laterally between said edge regions.

10. The combination of claim 1 wherein said sliding bearing comprises two half bearing members each edge welded to a respective portion of said component.

11. The combination of claim 10 wherein one of said portions of said component comprises a bearing cap.

12. The combination of claim 10 wherein said bearing halves are separable from one another.

13. The combination of claim 1 wherein the bearing material is metallic.

14. A method of joining a sliding bearing to a component, comprising:

providing a concave bearing seat in the component;

positioning a convex outer surface of a metal backing of the sliding bearing against the concave bearing seat of the component with at least one layer of bearing material being bonded to a concave inner surface of the backing; and welding only lateral edge portions of the backing to the component defining edge welds which are spaced across a central region of the backing between the edge welds, and isolating the bearing metal from any heat affected zone resulting from welding.

15. The method of claim 14 wherein the weld joint is made by laser welding.

16. The method of claim 14 wherein the weld joint is made by TIG welding.

17. The method of claim 14 including extending the lateral edge portions of the backing laterally beyond the bearing material.

18. The method of claim 17 including making the laterally extended end regions of the backing relatively thinner than the central portion of the backing.

19. The method of claim 14 including selecting a connecting rod as the component.

20. A combination of a component and a sliding bearing for supporting a member for movement relative to said component, said combination comprising:

a metal backing of the bearing having a convex outer surface and a concave inner surface extending longitudinally between opposite ends and laterally between opposite edge regions of said backing;

at least one layer of a relatively softer bearing material applied to said concave inner surface of said backing;

a concave seat of said component supporting said convex outer surface of said metal backing; and said backing being edge welded only along said edge regions to said component for securing said bearing to said component, and said edge welding producing a heat affected zone which is spaced from said bearing metal.

* * * * *